A. H. ALVERSON.
CUTTLE-FISH HOLDER.

No. 178,893. Patented June 20, 1876.

Witnesses.

Andrew H. Alverson
Inventor
By Atty.

UNITED STATES PATENT OFFICE.

ANDREW H. ALVERSON, OF NEW HAVEN, CONNECTICUT.

IMPROVEMENT IN CUTTLE-FISH HOLDERS.

Specification forming part of Letters Patent No. 178,893, dated June 20, 1876; application filed May 6, 1876.

*To all whom it may concern:*

Be it known that I, ANDREW H. ALVERSON, of New Haven, in the county of New Haven and State of Connecticut, have invented a new Improvement in Cuttle-Fish Holders; and I do hereby declare the following, when taken in connection with the accompanying drawings and the letters of reference marked thereon, to be a full, clear, and exact description of the same, and which said drawings constitute part of this specification, and represent, in—

Figure 1:
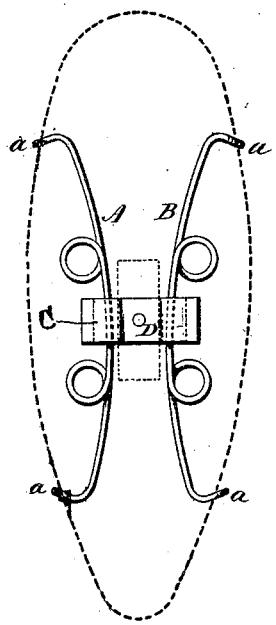
Figure 2:

Figure 1, a rear view, and in Fig. 2 a transverse section through the fastening device.

This invention relates to an improvement in device for securing cuttle-fish in bird-cages, the object being to make the fish attachable to the wires at any part of the cage, but applicable to holding other articles for the convenience of the bird in the cage. It consists in a pair of vertical spring-clamps combined with a turn-button at their center, by which the holder is secured to the wires of the cage, as more fully hereinafter described.

A and B are two springs, alike, save that one is for the right and the other for the left hand side. The upper and lower end of each of these springs is turned outward into a transverse hook form, $a$, and the two are secured together by a bar, C, at their center. To this bar the turn-button D is pivoted, and the bar and button are constructed so as to form a recess, $d$, each side of the pivot. This completes the construction.

To apply the device the fish, or whatever it may be, is placed within the grasp of the hooks, as seen in Fig. 1, the turn-button D turned into a vertical position, as seen in broken lines, Fig. 1, and the button passed from the inside of the cage outward between two wires, and then the button turned into a transverse position, as seen in Fig. 2, so as to embrace a wire of the cage each side of the pivot of the button, as indicated in Fig. 2, the wires being in the recesses $d$ between the button and bar. This enables the attachment of the holder at any point in the cage, and holds it firmly in that condition.

I claim—

The combination of the vertical springs A B, constructed with a hook at each end, and connecting-bar C, with the turn-button D, substantially as and for the purpose described.

ANDREW H. ALVERSON.

Witnesses:
 JOHN E. EARLE,
 CLARA BROUGHTON.